UNITED STATES PATENT OFFICE.

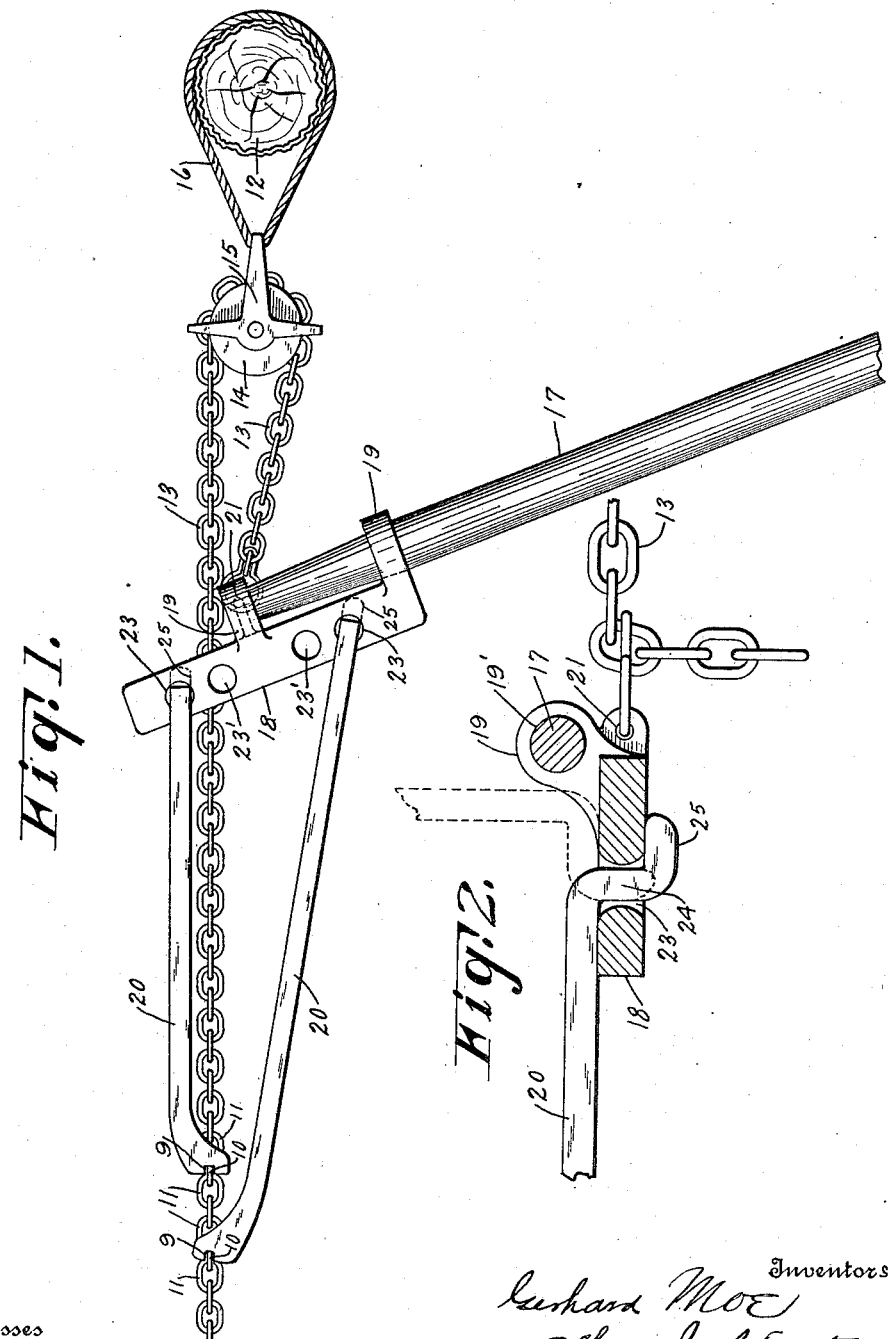

GERHARD MOE, OF LADYSMITH, WISCONSIN, AND ALFRED J. KIRSTIN, OF ESCANABA, MICHIGAN.

STUMP-PULLER.

1,226,616.      Specification of Letters Patent.      Patented May 15, 1917.

Application filed July 10, 1914. Serial No. 850,077.

*To all whom it may concern:*

Be it known that we, GERHARD MOE and ALFRED J. KIRSTIN, citizens of the United States, residing, respectively, at Ladysmith, county of Rusk, and State of Wisconsin, and Escanaba, county of Delta, and State of Michigan, have invented new and useful Improvements in Stump-Pullers, of which the following is a specification.

Our invention relates to improvements in that class of stump pullers by which stumps are pulled by the vibratory movement of an operating lever, which lever is manually operated by a person. Heretofore the grab hooks employed in this class of stump pullers has been retained in contact with a chain or cable by a spring or other mechanical mechanism, by which such hooks are forced toward the cable and caused to engage the same as the lever was manually operated. The object of our present improvements, is first, to so connect the grab hooks with the lever that they will drop into engagement with the chain or cable of their own gravity, whereby the necessity of employing springs or other equivalent mechanism for forcing the hooked ends of the grab hooks into engagement with the chain or cable is avoided. Our invention pertains, second to the device for detachably connecting one end of the grab hooks with the operating lever in such a manner that they may be readily adjusted nearer to or farther from the fulcrum of such lever.

Our invention is further explained by reference to the accompanying drawings, in which—

Figure 1 is a plan view of a form of our device showing the grab hooks detachably connected with the operating lever, and Fig. 2 is a vertical section of a portion of the operating lever in connection with a portion of one of the grab hooks showing the manner of detachably connecting such hook to such lever.

Like parts are identified by the same reference numerals throughout the several views.

By the form shown in Fig 1, the operating lever 17 is provided with a metallic bracket 18 which forms a continuation of said lever, said lever is connected with said bracket through a pair of loops 19, 19, which loops 19 are provided with apertures 19', through which said lever 17 is inserted, as shown in Fig. 1. The object of said bracket 18 is to facilitate the adjustment of the grab hooks 20, 20, nearer to or farther from the fulcrum 21 of said bracket, whereby the power of the operating lever 17 may be readily and quickly increased or diminished according to the adjustment of said grab hooks.

To facilitate the rapid adjustment of the grab hooks nearer to or farther from the fulcrum as stated, we have provided the bracket 18 with a plurality of apertures 23 and 23' for the reception of the rear ends of said grab hooks and the grab hooks 20 are each provided with angular bends 24 and 25, as shown in Fig. 2, whereby said grab hooks are adapted to be readily and quickly removed from one pair of apertures to the other. When less power is required the rear ends of the grab hooks are inserted in the apertures 23, which are farthest from the fulcrum 21. When, however, a larger stump is being pulled and a greater power is required, the rear ends of the grab hooks 20 are preferably inserted in the apertures 23' nearest to the fulcrum, whereby said grab hooks will be caused to move more slowly and with greater power along said cable. When removing the grab hooks 20 from one set of apertures to another, they are first raised to a vertical position indicated by dotted lines in Fig. 2, whereby the ends 25 of said levers may be readily withdrawn from one set of said apertures and inserted in the other set. After the ends 25 have been thus inserted in the other set of apertures said grab hooks are brought down to the horizontal position shown in said Fig. 2, when they are retained in place by the horizontal members 25. It will be obvious that by this arrangement the adjustment of said grab hooks nearer to or farther from the fulcrum of said lever will be readily and quickly accomplished. While the cable 13 shown and described comprises a plurality of links, we wish it to be understood that a wire or other form of cable, may if desired, be substituted therefor, in which case the hooked members of the grab hooks will be changed accordingly.

Having thus described our invention, what we claim as new and desire to secure by Letters Patent, is—

In a device of the described class, comprising a cable adapted to be connected at one end to a stationary object and at its opposite end to a stump or other movable object and a manually operated lever the combination with such manually operated lever of a pair of grab hooks, each grab hook being provided at its rear end with a downward and rearward bend, said bend being adapted to be inserted through apertures provided therefor in said lever, said grab hooks being each provided at its front end with a pair of vertical hooks adapted by their gravity to drop into engagement with the links of said cable.

In testimony whereof I affix my signature in the presence of two witnesses.

GERHARD MOE.

Witnesses:
JAS. B. ERWIN,
ALICE J. McKERIHAN.

In testimony whereof I affix my signature in the presence of two witnesses.

ALFRED J. KIRSTIN.

Witnesses:
F. B. BEMENT,
WM. SHEPECK.

Copies of this patent may be obtained for five cents each, by addressing the "Commissioner of Patents, Washington, D. C."